A. F. FORD.
GEARLESS DIFFERENTIAL.
APPLICATION FILED JULY 11, 1916.

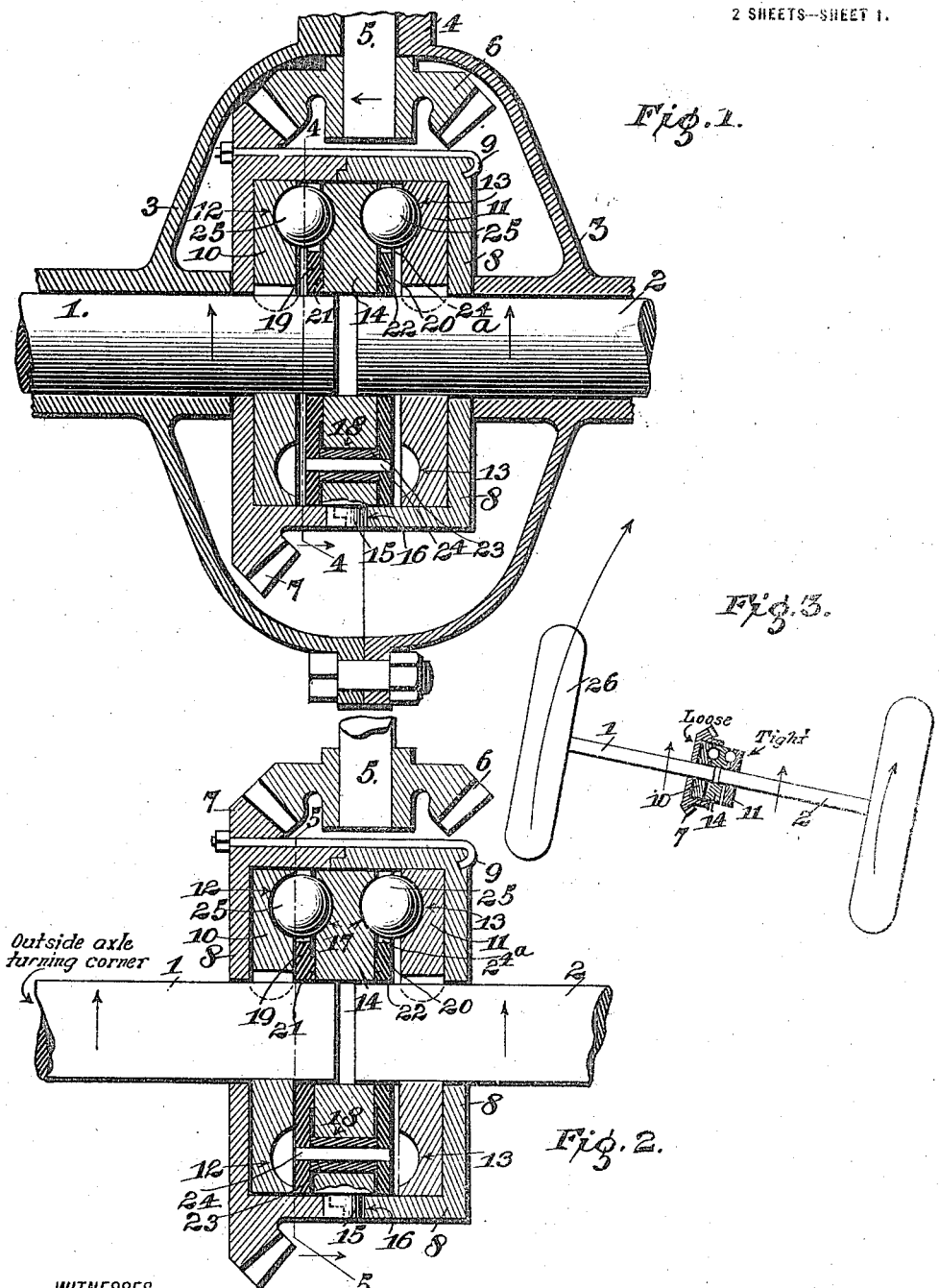

1,238,659.

Patented Aug. 28, 1917.
2 SHEETS—SHEET 2.

INVENTOR
Andrew F. Ford
BY
ATTORNEYS

UNITED STATES PATENT OFFICE.

ANDREW F. FORD, OF WALLA WALLA, WASHINGTON.

GEARLESS DIFFERENTIAL.

1,238,659.

Specification of Letters Patent.

Patented Aug. 28, 1917.

Application filed July 11, 1916. Serial No. 108,636.

*To all whom it may concern:*

Be it known that I, ANDREW F. FORD, a citizen of the United States, and a resident of Walla Walla, in the county of Walla Walla and State of Washington, have invented a certain new and useful Improvement in Gearless Differentials, of which the following is a specification.

My invention relates to differential mechanisms for the rear shafts of automobiles, and it consists in the combinations, constructions, and arrangements herein described and claimed.

In automobiles of the present construction the rear axles are constructed in two parts. The two ends of the axles are provided with bevel gears and connected with the driving shaft of the engine by a bevel pinion which serves to drive the axles. It is to eliminate the complicated nature of the gearing and simplify the differential construction to a large extent that I have devised the present construction.

It is therefore an object of my invention to provide a gearless differential clutch which is simple in construction and effective for the purpose for which it is used.

Another object of the invention is to provide a differential clutch which includes axle disks mounted on the opposed ends of the rear axle, means being disposed between the axle disks for locking these disks endwise with the driving element of the transmission.

Other objects and advantages will appear from the following specification, reference being had to the accompanying drawings forming a part thereof, in which:

Figure 1 is a vertical cross section of a gearless transmission clutch constructed in accordance with my invention, the axle disks being locked for rotation with the driving element;

Fig. 2 is a similar view, one of the axle disks being locked to the driving element while the engagement of the other is shown loose therewith, as when the vehicle turns a corner;

Fig. 3 is a diagrammatic view illustrating the connection of the disks and shafts as when the vehicle turns a corner;

Figure 4:
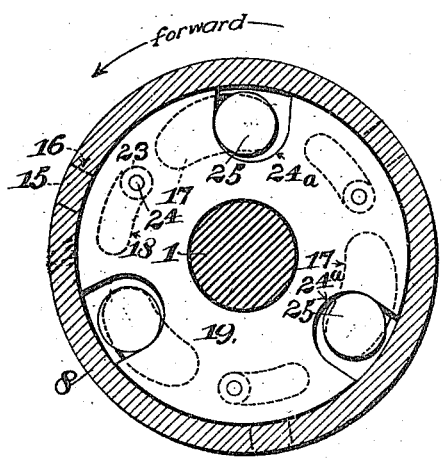
Fig. 4 is a cross section on line 4—4 of Fig. 1.

By reference to Fig. 1 of the drawings, it will be seen that the axially opposed rear axles 1 and 2 are projected into the housing 3 of the automobile. The housing 3 is of any suitable construction, and may be a housing such as is installed on automobiles of the present construction, it being possible in installing my device to simply remove the gearing of the differential as in present use. The housing 3 is provided with the boss 4 at one end in which the driving shaft 5 is journaled. The driving shaft 5 carries a beveled driving pinion 6 which meshes with the gear 7 of the driving element or housing 8. The driving element 8 consists of a housing constructed in two parts joined centrally thereof. The two parts of the casing 8 are held together by spanner bolts 9, as shown in Fig. 1, there being a sufficient number of bolts disposed about the periphery of the casing 8 to hold the two sections in tight contact.

The driving element 8 forms an essential part of my invention. Mounted near the ends of each of the opposed shafts 1 and 2, and disposed within the driving element or casing 8, are axle disks 10 and 11. Each of the axle disks 10 and 11 has an annular ball race 12 and 13 respectively. Disposed between the opposed axle disks is a center disk 14 which has a plurality of lugs 15 on its periphery. When the device is assembled as shown in Fig. 1, the lugs 15 of the center disk 14 project into suitable apertures 16 in the driving element 8.

Figure 6:
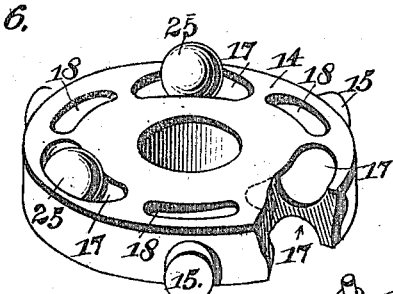
Fig. 6 is a perspective view of the center disk, parts being shown in section.
Figure 7:
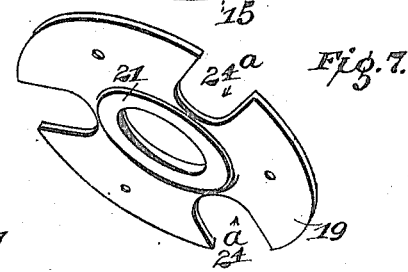
Figs. 7 and 8 are perspective views of the governor disks.
Figure 8:
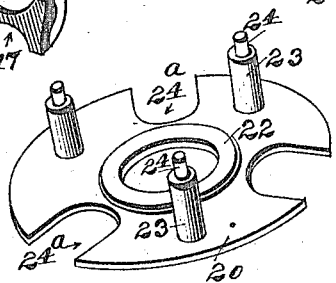
Figure 9:
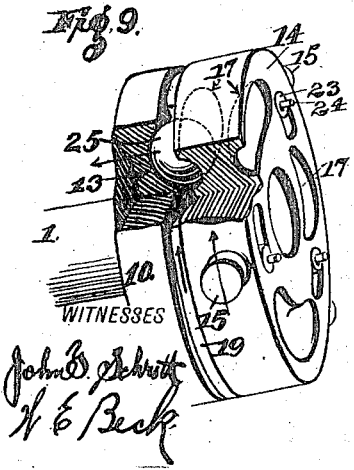
Fig. 9 is a perspective view of a portion of the device illustrating the action of locking one of the axle disks to the driving element, parts being shown in section.

By reference to Fig. 6 it will be seen that the center disk 14 is provided with a plurality of ball recesses 17, six being shown in the present instance, three on each side.

Arranged between the ball recesses 17 are elongated openings 18.

By now referring to Fig. 1 it will be seen that governor disks 19 and 20 are disposed at each side of the center disk 14, the governor disks 19 and 20 having annular bosses 21 and 22 respectively. In assembling the device the governor disks 19 and 20 are placed with the annular bosses in engagement with the center disk 14 so that the governor disks may move easily over the face of the center disk.

The governor disks 19 and 20 are held in spaced relationship with each other and against the surface of the center disk 14 by spacers 23 and pins 24. The governor disks are suitably apertured to receive the pins 24 and the spacers 23 are disposed in elongated apertures 18 of the center disk 14. When the center disk 14 is moved the elongated apertures 18 therein will be advanced until their ends engage the spacers 23, when the governor disks will be advanced accordingly, for a purpose presently to be more fully explained.

Figure 10:
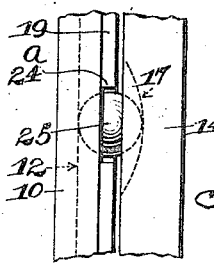
Fig. 10 is a detail plan view of the device, showing the position of one of the balls when the axle disk is loosened from the driving element.

It has been pointed out that the center disk 14 is provided with three ball recesses 17 in each side. Each of the governor disks 19 and 20 is provided with a similar number of ball pockets 24a. Balls 25 are located in the respective pockets 24a of the governor disks 19 and 20, and the balls engage the ball recesses 17 of the center disk 14 and the ball recesses or races 12 and 13 of the axle disks 10 and 11, respectively, as shown in Fig. 1. It will be observed by particular reference to Figs. 6 and 10 that the ball recesses 17 are not of an equal depth, but are formed with their greatest depth in the center which gradually declines outwardly until the recess merges with the face of the disk 14. This peculiar shape of the ball recesses 17 performs an essential function in transmitting the driving force of the shaft 5 to the axles 1 and 2.

Having now described the construction of my device, the operation thereof is as follows: Reference is now directed to Fig. 1. It has been stated that the driving pinion 6 of the shaft 5 meshes with the bevel gear 7 of the driving element 8 of the device. Rotation being now imparted to the shaft 5 in a counter-clockwise direction, the driving element 8 will be caused to move forwardly as shown in Fig. 4.

The forward rotation of the driving element 8 is now imparted to the center disk 14 through the medium of the lugs 15. The center disk 14 will then rotate until one end of each of the openings 18 engages the adjacent spacer 23 of the governor disks 19 and 20, as shown in Fig. 4. This initial rotation of the center disk 14 also caused the ball recesses 17 to advance relative to the balls 25 until, as shown in Fig. 4, the balls 25 are positioned at the shallow ends of the ball recesses 17. This act of initially rotating the center disk 14 and thus causing the ball recesses 17 to advance under the balls 25 until they are supported in the shallow portion of the recesses 17, causes the balls 25 to move outwardly from the disk 14 and brings the axle disks 10 and 11 against the adjacent surfaces of the driving element 8.

As has been stated, the axle disks 10 and 11 are secured to the shaft ends 1 and 2. This is done by a suitable key or keys. It will be observed however, that connection of the disks with the shaft is not absolutely rigid but that the disks are susceptible of slight longitudinal sliding movement. This is necessary for the performance of the function of thrusting the axle disks 10 and 11 against the adjacent walls of the driving element 8, as has been pointed out. This slight longitudinal movement of the axle disks on their keys will have no ill effect on the moving parts, since these axle disks 10 and 11 are inclosed in the casing of the driving element, and are thereby protected from undue longitudinal movement.

The forward rotation of the axles 1 and 2 is now effected since the axles 10 and 11 are tightly locked into engagement with the driving element 8. It will also be observed in Fig. 4 that the associated openings 18 and ball recesses 17 in coöperation with the balls 25 and spacers 23 form "wedges" which prevent relative movement of the adjacent disks 10 and 11 with the center disk 14 when the parts are locked, as shown in Fig. 1. This is so because the spacers 23 are now disposed in the base of each of the openings 18 while the balls 25 are disposed in the extreme shallow portion of the ball recesses 17. The balls 25 cannot roll out of the ball recesses 17 because they are tightly wedged against the adjacent disks 10 and 11, and are also held in such position by the governor disks 19 and 20. Since, as before stated, the governor disks 19 and 20 are now held in fixed relationship with the spacers 23, the balls 25 are forced to move with the center disk 14 and compel the rotation of the shafts 1 and 2.

Figure 5:
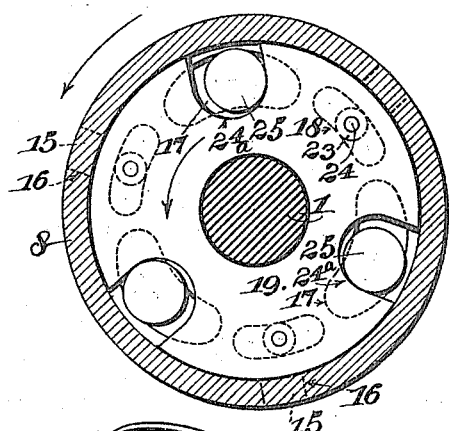
Fig. 5 is a cross section on line 5—5 of Fig. 2;

When the automobile turns a corner toward the right, as shown in Fig. 3, the outer wheel 26 causes the shaft section 1 to rotate faster than the shaft section 2. The first impulse of the axle disk 10 will be to depart from the center disk 14 in the plane of rotation; in other words, it will move faster. It should be remembered that the disk 10 is in tight frictional engagement with the balls 25 on that side of the center disk 14. The tendency now is since the disk 10 begins to rotate faster than the other parts are rotating, to move the adjacent balls 25 from the shallow portion of the recesses 17 toward the region of greatest depth, as shown in Fig. 5. The tight frictional engagement of the disk 10 with the driving element 8 is now relieved and since the balls 25 on that side are now positioned in the center of the recesses 17, the shaft 1 is free to rotate at a more rapid rate with the shaft 2. The tendency now is to move the balls 25 toward the shallow portion of the recesses 17, oppositely to where they are positioned in Fig. 4. This tendency, however, is obviated by the forward rotation of the parts, including the center disk 14, thus virtually transporting the recesses 17 with the balls 25. The components of the rotational movement of the center disk 14 and the more rapidly rotating disk 14 are such that the balls 25 on the now loosened side of the device will be kept substantially in the center of the recesses 17 and locking of the disk 10 with the driving element 8 prevented. This position of the parts as shown in Figs. 2 and 3, continues as long as the automobile is turning the corner. As soon as the automobile is on a straight course again the action of the center disk 14 on the balls 25 will be repeated. The disk 10 will then again be locked into tight frictional engagement with the driving element 8 and the uniform driving of the shaft ends 1 and 2 will be resumed.

I wish to particularly emphasize the endwise engagement of the center disk 14 with the adjacent axle disks 10 and 11. I am aware that devices of this kind have been developed in which the locking elements were arranged on the periphery of what might be the equivalent of my axle disks 10 and 11. I have found however that by placing the locking elements as shown in Fig. 1 that the torque of the motor is more readily transmitted to the shafts 1 and 2, and that a more rigid connection between the driving shaft 5 and the shafts 1 and 2 is established.

While the construction as shown and described is the preferred one, it is obvious that numerous variations may be made without departing from the spirit of the invention or the scope of the appended claims.

I claim:—

1. A differential gearing comprising in combination two laterally spaced driven members, a driving member disposed between the driven members, and sets of clutch elements having independent circumferential and lateral movement disposed at opposite sides of the intermediate driving member and between it and the respective driven members.

2. A differential gearing comprising in combination a driving member, driven members at the sides of the driving member, one of the adjacent faces of the members being provided with an annular race, and the remaining adjacent face having recesses in co-incident position with such races, and clutch elements at the sides of the driving member and between it and the driven members, and disposed in the recesses and races and having a limited, independent, circumferential and lateral movement.

3. A differential gearing comprising a middle or driving and side or driven members, clutch elements at the sides of the middle member and between it and the side members, and governor members between the middle or driving and side or driven members engaging the clutch elements to cause simultaneous movement of the said clutch elements.

4. A differential gearing comprising a middle or driving and side or driven members, clutch elements at the sides of the middle member and between it and the side members, governor members between the middle or driving and side or driven members engaging the clutch elements to cause simultaneous movement of the said clutch elements, and connecting means between the governor members to cause them to move together.

5. In a differential clutch, the combination of axially disposed shaft ends, axle disks having ball races mounted on the ends of the shafts, a casing inclosing the axle disks, a driving pinion, a center disk having ball recesses on its side faces, said ball recesses being of uniform length and having shallow gradations toward their ends, balls disposed in the ball recesses and the ball races of the axle disks, and means associated with the center disk for retaining the balls in the shallow regions of the ball recesses during the rotation of the center disk.

6. In a differential clutch, the combination of axially disposed shaft ends, axle disks mounted on the shaft ends and having ball races, a center disk disposed between the axle disks and having ball recesses of varying depth, said disk also having elongated openings intermediate of the ball recesses, balls located in the ball recesses and engaging the ball races, a governor disk at each side of the center disk and having ball pockets, spacers located in the openings in the center disk and joining the governor disks in spaced relation, a driving element and connections between the center disk and the driving element.

7. In a differential clutch, the combination of axially disposed shaft ends, axle disks keyed to the shaft ends for rotation therewith and having slight longitudinal movement relatively thereto, said disks having ball races, a casing having radial apertures and a gear, the casing comprising a driving element, a center disk having ball recesses arranged on the opposite faces thereof, the ball recesses being arc shaped and deep in the center and shallow toward the edges, a governor disk having an annular boss in contact with each face of the center disk, said governor disks having ball pockets, balls located in the ball recesses in engagement with the axle disks and embraced by the ball pockets of the governor disks, spacers between the governor disks and projected through the center disk, and lugs on the center disk disposed in the apertures of the casing for rotating the center disk upon rotation of the driving element.

ANDREW F. FORD.

Witnesses:
CLYDE C. COOPER,
CON. T. KELLY,
JOHN F. STACK.

Copies of this patent may be obtained for five cents each, by addressing the "Commissioner of Patents, Washington, D. C."